United States Patent [19]
Zubini et al.

[11] Patent Number: 5,725,635
[45] Date of Patent: Mar. 10, 1998

[54] METHOD TO REMOVE ORGANIC HALOGENATED MOLECULES FROM GASEOUS CURRENTS AND RELATIVE PLANT

[75] Inventors: Fulvio Zubini, Trieste; Iginio Colussi, Martignacco; Vittorino Gallo, Muzzana; Matteo Vittorio Losciale, Udine, all of Italy

[73] Assignee: Danieli & C. Officine Meccaniche SpA, Buttrio, Italy

[21] Appl. No.: 628,267

[22] Filed: Apr. 5, 1996

[30] Foreign Application Priority Data

Apr. 7, 1995 [IT] Italy .................. UD95A0062

[51] Int. Cl.$^6$ .................. B01D 45/16; B01D 47/10; B01D 51/00; B01D 53/08
[52] U.S. Cl. .................. 95/67; 95/69; 95/92; 95/110; 95/114; 95/142; 95/143; 95/214; 95/286; 96/18; 96/27; 96/53; 96/57; 96/123; 96/128; 96/150; 55/222; 55/235; 55/257.4; 55/257.7; 55/258; 55/270
[58] Field of Search .................. 95/63, 67–70, 95/79, 92, 107–110, 114, 115, 141–143, 214, 273, 286, 287; 55/222, 233, 235, 257.1, 257.4, 257.7, 258, 259, 270, 315; 96/18, 25, 26, 27, 52, 53, 55, 57, 108, 123, 126–128, 136, 138, 143–146, 150

[56] References Cited

U.S. PATENT DOCUMENTS

| | | | |
|---|---|---|---|
| 3,493,342 | 2/1970 | Weaver et al. | 95/214 X |
| 3,966,879 | 6/1976 | Groenendaal et al. | 95/107 X |
| 3,977,846 | 8/1976 | Russell et al. | 95/108 |
| 4,065,271 | 12/1977 | Weckesser et al. | 95/108 X |
| 4,530,822 | 7/1985 | Ashley et al. | 95/214 X |
| 4,548,797 | 10/1985 | Sauer et al. | 95/69 X |
| 4,750,916 | 6/1988 | Svensson | 95/67 X |
| 5,013,336 | 5/1991 | Kempf | 55/71 |
| 5,464,597 | 11/1995 | Tang | 95/108 X |
| 5,514,356 | 5/1996 | Lerner | 95/142 X |

FOREIGN PATENT DOCUMENTS

| | | | |
|---|---|---|---|
| 479350 | 4/1992 | European Pat. Off. | |
| 3615027 | 11/1987 | Germany. | |
| 3919124 | 1/1990 | Germany | 95/141 |
| 3842336 | 6/1990 | Germany | 95/141 |
| 4031771 | 4/1992 | Germany. | |
| 0673592 | 3/1990 | Switzerland | 95/141 |

OTHER PUBLICATIONS

Muell Und Abfall, vol. 23, No. 4 1 Apr. 1991 pp. 229–235 Vicinus J. et al. "Abscheidung Von Dioxinen".

*Primary Examiner*—Robert Spitzer
*Attorney, Agent, or Firm*—Antonelli, Terry, Stout, & Kraus, LLP

[57] ABSTRACT

Method to remove organic halogenated molecules from gaseous currents arriving as a residue of industrial working processes or not, the gaseous current being delivered into a reactor (16) containing a fluid bed consisting of at least one solid adsorbent element after having undergone at least one filtration followed by a cooling, the gaseous current cooperating with the solid particles with exchange by adsorption between the gaseous current and the solid particles, the reactor (16) achieving a time of contact between the gaseous current and the solid particles at least longer than 3 seconds, the gaseous current which enters the reactor (16) having a temperature lower than 80° C., but advantageously between 30° and 70° C., the cooling of the gaseous current upstream of the reactor (16) being followed by a gas/water or gas/air heat exchanger (13). A plant to carry out the above method includes a reactor having a first input zone (17) and a second zone of exchange by adsorption between the gaseous current and a solid support in the form of fluid-bed particles kept in suspension, and a distribution plate (18) to introduce and distribute the gaseous current defining the second zone of the reactor (16), the reactor (16) having dimensions such as to achieve a passage time at least longer than 3 seconds, the concentration of solid support within the reactor (16) being between 0.1 and 0.5 kg per each cubic meter of gaseous substance.

26 Claims, 1 Drawing Sheet

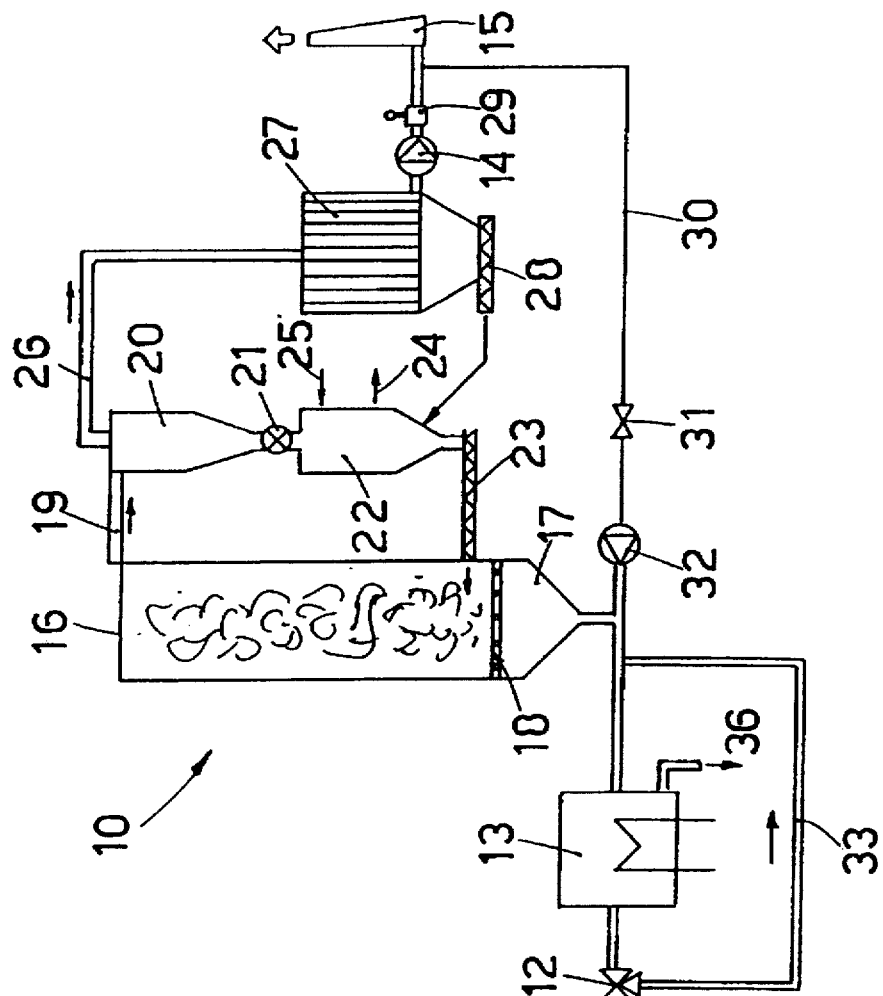
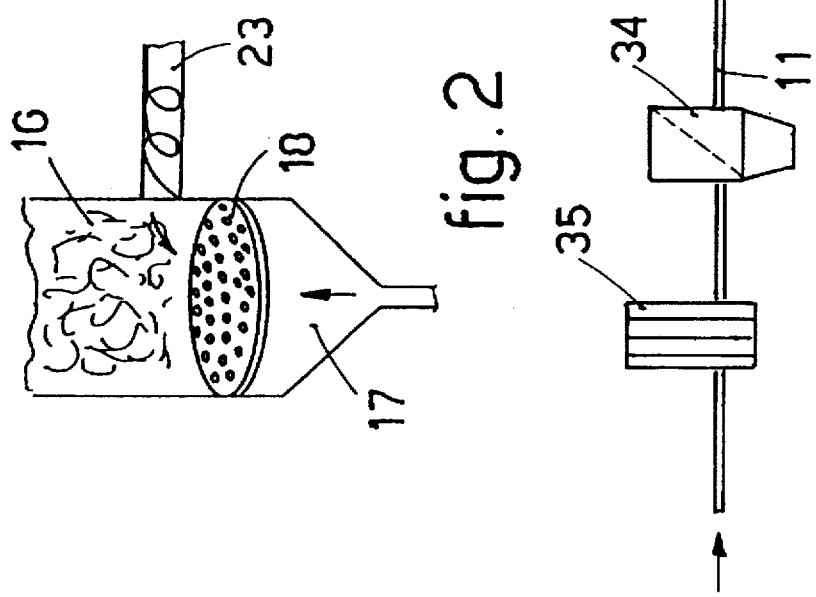

METHOD TO REMOVE ORGANIC HALOGENATED MOLECULES FROM GASEOUS CURRENTS AND RELATIVE PLANT

BACKGROUND OF THE INVENTION

This invention concerns a method to remove organic halogenated molecules from gaseous currents and the plant which carries out that method.

To be more exact, the invention is employed to purify the gaseous currents produced by industrial working processes which specifically, but not only, concern electric arc furnaces for the melting of iron scrap, ferrous materials and iron-based alloys by reducing the toxic and/or harmful organic halogenated compounds contained in those gaseous currents.

The invention can also be applied in cooperation with incinerator furnaces, heat generation plants and other plants of an analogous type.

The state of the art of various fields, whether linked or not to the working of industrial processes, discloses the problems connected to the reducing and separation of toxic and/or harmful organic halogenated compounds comprised in solid, liquid or gaseous waste products so as to enable such waste products to be removed and disposed of.

In this connection the state of the art covers disclosures and trials of a plurality of different solutions concerning also the specific field of interest.

Within the scope of processes for disposal of solid urban wastes add toxic hospital wastes, a possible technology to reduce toxic organic halogenated substances such as dioxins (PCDD) and furans (PCDF) provides for the treatment of fumes at a high temperature (1000° C. or more for instance) for long enough times (at least more than 2 seconds).

Techniques have also been disclosed for reducing organic halogenated compounds by employing a water-spray quenching process and a subsequent collection of the powders by means of a suitable filter system.

Another technique of the state of the art provides for the injection of adsorbent solids (such as activated carbon for instance) into the fumes in the pipes which lead to the filtration system.

As is known, the adsorption consists in the possibly selective fixing of the molecules of a fluid to the surface layer of a solid or liquid with which the fluid comes into contact.

The technique which uses the injection of adsorbent solids leads to an almost complete reduction of the organic molecules in a field of temperatures between about 110° and 210° C.

Moreover, the efficiency of removal is not particularly affected by the temperature of the gas within the filter.

A further reduction technique of the state of the art provides for the adsorption of the toxic and/or harmful organic molecules by making the gaseous current pass through a fixed bed of activated carbon.

Yet another technique provides for a very quick quenching of the gaseous current with the use of inert solids so as to obviate the re-forming of the dioxins.

None of these techniques of the state of the art has been found fully satisfactory for the treatment of gaseous waste substances produced in the working of industrial processes such as, in particular, the processes connected to the melting and/or pre-heating of scrap iron or scrap of iron-based alloys.

In particular, within the scope of such processes, these techniques do not give satisfactory results in terms of efficiency, reliability over a wide range of temperatures and of compositions of the gaseous current or economical working and also entail problems of management and use on an industrial scale.

EP-A-479,350 describes a process to separate heavy metals and dioxins from the product of combustion in a waste incinerator plant.

This process arranges to pass the fumes produced by the incinerator plant through a fluid bed reactor at a temperature between 80° and 200° C.

In this document the gaseous currents leaving the incinerator, after a preliminary filtration step, are subjected to a cooling step within a water-spray adsorption plant or alternatively in a multi-stage scrubber, in which the temperature of the gaseous currents is brought to a value of 140° C.

According to this method of cooling of a direct type the particles of powdered residue in the gaseous currents take on a high degree of humidity at the outlet of the cooling unit and therefore at the inlet of the fluid bed reactor.

These residues with a high degree of humidity, when they come into contact with the particles of the active adsorbent substances within the fluid bed reactor, transfer at least part of such humidity to those active substances, thereby causing a considerable reduction of the efficiency of the adsorption action of those active substances; moreover, this situation creates a great obstacle to the recirculation of those active substances and leads in a short time to the blockage of the conduits and of the separator.

Furthermore, the high degree of humidity has the effect that the temperature of the fumes cannot be further lowered below the above level so as not to surpass the dew point of the individual components of the powdered residue and thus to create condensation.

All of the above entails a serious limitation of the efficiency of the adsorption within the fluid bed reactor.

Moreover, according to this document the concentration of active substances within the fluid bed reactor is high, between 0.5 and 50 kgs/m$^3$, so as to ensure a correct adsorption of all the substances to be abated.

Furthermore, so as to abate the acid and aggressive residues contained in the gaseous currents to be purified, such as HCl, HF and SO$_2$, this document arranges to add to the active substances in the fluid bed reactor additives such as volatile ash, lime, calcium carbonate or other materials since these acid and aggressive residues cannot be eliminated upstream of the reactor owing to the process conditions prevailing there.

All of the above entails an increase in the consumption of active adsorbent substances, a higher level of powdered residue at the outlet of the fluid bed reactor, the need to regenerate often the fluid bed itself, the need to replace often the filtering elements and yet other drawbacks.

The article taken from "MUND UND ABFALL", Band 23, No.4 of April 1991 describes on pages 229–235 a method for reducing dioxins and mercury whereby the gaseous currents to be purified are sent into a fluid bed reactor at a temperature between 100° and 120° C.

This article too provides for the use of additive substances such as lime or the like according to the presence of acid or aggressive substances in the gaseous currents to be purified.

In this case too the relatively high temperature, the high degree of humidity of the particles of powdered residue delivered to the reactor, the use of a high concentration of active substances in the fluid bed together with the addition of additive substances involve all the drawbacks mentioned above.

SUMMARY OF THE INVENTION

The present applicants have designed, tested and embodied this invention to overcome these problems and to achieve further advantages.

The purpose of the invention is to establish a method and the relative plant to perform the method which are suitable to remove and reduce the toxic and/or harmful organic halogenated molecules contained in the gaseous currents and produced as a residue of operations linked, or not, to industrial processes.

This invention can be used, for instance, in cooperation with industrial plants pre-arranged for the melting or pre-heating of scrap iron or scrap of iron-based alloys.

The invention arranges to use the principle of exchange by adsorption between the gaseous current circulating at high speed and produced as a residue in an industrial plant, or not, and a solid support included in suspension in a fluid bed.

In this connection the invention arranges to deliver the gaseous current, which contains the organic halogenated substances requiring to be reduced and consisting of dioxins and furans for instance, into a first heat exchanger which performs a first cooling of the gaseous current to a temperature between about 120° and 200° C.

The gaseous current is then delivered through a filtration unit suitable to free the current from the powders contained in it.

According to the invention this filtration unit possesses very high efficiency characteristics to prevent the powders not retained from being able to cause ill-functioning of the means positioned downstream.

This filtration unit may be of different types according to the type of plant with which the invention is associated and according also to the type of gas to be purified.

In the event of use in melting furnaces it is preferable to use a fabric filter of a sleeve type or, as an alternative, an electrostatic precipitator.

Where the filtration unit is to be used in incinerators or plants of an analogous type, it is preferable to use filters of a Venturi scrubber type; as an alternative, a filtration unit of a high-efficiency cyclone type can be used.

The gaseous current leaving the filtration unit is sent to a cooling unit and is then delivered thence at a high speed through a fluid bed which acts as a suspension carrier for the solid support.

This lay-out, which determines a drawing of the solid particles by the gaseous current along the whole extent of the element containing the fluid bed, makes possible a prolonged and continuous contact between the gaseous current and the solid support, thus leading to an efficient adsorption of the organic halogenated substances.

According to the invention the solid support consists of activated carbon in a particulate form or as a powder, or of solid particles or powders of another type, or of a suitable mixture of activated carbon and powders. For example, the solid support may comprise activated carbon in the form of particles and powder and also powders coming from the filtration system if the gaseous fluids (gaseous current) thus treated contains solid parts in suspension. In other words, the auxiliary powders which may range from 0% to 96% of the overall solid support may be solid residues of the process itself if such residues are included in the gaseous fluid thus treated. These solid residues therefore consist of the solid parts in suspension borne by the fluid which reaches the filtration assembly. The sizes of these solid parts in suspension range from about 1 micron to about 1.0 to 1.2 mm., depending on the characteristics of the industrial factory emitting the gaseous fluid to be treated.

The method according to the invention includes a preliminary cooling of the gaseous current leaving the processing plant down to a temperature at least below 80° C., advantageously between 30° C. and 70° C., but preferably between 40° C. and 60° C.

This reduction of temperature is achieved by means of a cooling system of an indirect type produced by making the gaseous current, the temperature of which has been lowered beforehand to about 120° and 200° C. pass in contact with an air or water heat exchanger element.

This cooling system of an indirect type reduces to a minimum the degree of humidity taken on by the organic residues in the gaseous current, and therefore temperatures can be reached which are considerably lower without creating problems of localised condensation.

The lower degree of humidity of the particles sent to the reactor reduces considerably the problem of the contamination by humidity of the active substances in the fluid bed and also reduces the consequences linked to the efficiency of the adsorption action.

Moreover, the problems linked to the recirculation of those active substances are reduced.

Furthermore, the type of the cooling together with the temperature level reached make it possible to achieve directly in the heat exchanger the elimination by condensation of the acid and aggressive substances possibly contained in the gaseous currents to be purified.

This situation obviates the need to use additive substances within the fluid bed in addition to the active substances in the event of use, for instance, in incineration plants where the content of such acid and aggressive substances is often great.

In other words, the fluid bed of active substances is made substantially independent of the type of plant with which it is associated and of the type of gas to be purified.

All of this also enables a very reduced concentration of active substances to be used, for instance, between 0.1 and 0.5 kg/m³, thereby involving a great saving in the working costs of the plant.

The cooled gaseous current is then sent through a reactor containing the circulating fluid bed, in which is performed the exchange by contact between the gaseous current and the solid support in suspension in the circulating fluid bed.

The flow generated by the gaseous current moves the powders constituting the solid support, thus causing the expansion or possible formation of the fluid bed to the point of provoking the at least partial drawing of the solid support.

The fluid-bed reactor is equipped at least with means for the introduction, deceleration, acceleration and distribution of the gaseous current and at least with means to feed and replenish the solid support.

According to the invention the gaseous current while passing through the reactor remains in contact with the solid support for a time between about 3 and 10 seconds, but preferably between 5 and 8 seconds.

The prolonged interaction between the gaseous current and the limit layer of the solid particles causes a very intense exchange of heat and of matter and therefore a high adsorption speed with a resulting high efficiency of exchange.

The gaseous current and the solid particles drawn by the current are sent to a separation and filtration system, which has the purpose of recovering the whole, or at least a part of, the solid support mixed with the gaseous current.

According to the invention this separation and filtration system is associated with a recirculation system, which brings continuously the solid particles separated by the separation and filtration system back into the reactor.

In this case the efficiency of the recirculation system is great since the degree of humidity of the organic molecules to be removed from the gaseous current introduced into the reactor is very low.

The solid support is normally discharged and replaced wholly or partly when its adsorbing power has been reduced by a substantial value.

BRIEF DESCRIPTION OF THE DRAWINGS

The attached figures are given as a non-restrictive example and show a preferred embodiment of the invention as follows:

FIG. 1 is a diagram of a possible plant to carry out the method to remove the organic halogenated particles by adsorption according to the invention;

FIG. 2 shows in an enlarged scale a detail of the adsorption reactor according to the invention.

DETAILED DESCRIPTION OF THE PREFERRED EMBODIMENTS

A plant 10 shown in FIG. 1 is arranged to cooperate downstream of a plant (not shown here for industrial processings, or not.

A specific application may consist of a plant to treat fumes which is associated with an electric arc furnace for the melting or pre-heating of scrap iron or scrap of iron-based alloys.

The gaseous current produced as a processing residue and containing toxic and/or harmful organic halogenated substances, such as dioxins and furans, is delivered through a first pipeline 11 into a pre-cooling assembly 35.

The pre-cooling assembly 35 is of a type with a heat exchanger and performs an indirect cooling of the gaseous current and lowers the temperature thereof to a value of about 120°–200° C.

The gaseous current is delivered from that pre-cooling assembly 35 to a filtration assembly 34, which is for instance of a type with sleeves consisting of fabric where the plant 10 is installed at the outlet of a melting furnace.

The filtration assembly 34 carries out a high-efficiency separation of the powders from the gaseous current so as to obviate problems in the working of the downstream means.

The filtration assembly 34 may also be of a Venturi scrubber type in the event of application to an incineration plant, or of an electrostatic precipitator type or also a high-efficiency cyclone separator.

The gaseous current downstream of the filtration assembly 34 is sent through a modulating valve 12 to a further cooling step, in which the temperature is lowered at least below 80° C., but advantageously to a value between 40° C. and 60° C.

Where the temperature of the gaseous current already has a value of about these levels at the outlet of the filtration assembly 34, the cooling assembly 13 is by-passed by sending at least a part of the gaseous current through a second pipeline 33.

A unit which aspirates the gaseous current into the plant 10 consists in this case of a fan 14 located, as an example, in the vicinity of a discharge stack 15.

In this case the cooling assembly 13 consists of a gas-water heat exchanger.

This type of indirect cooling enables the gaseous current to be brought to a very low temperature without causing high levels of humidity in the particles included in the gaseous current to be purified.

The type of the gas/water heat exchanger 13 makes possible also the presence of dry and saturated-humid gaseous currents inasmuch as the condensation of any acid gases or aggressive substances in general is removed through a third pipeline 36 in view of the cooling conditions.

Downstream of the cooling assembly 13 the gaseous current is delivered from below upwards into a reactor 16 having a vertical development, within which is comprised a fluid bed acting as a suspension carrier for a solid adsorbent support.

This fluid bed is generated at least partly by the gaseous current itself entering the reactor 16.

According to a variant auxiliary means to deliver gaseous substances are included in cooperation with the reactor 16 and are suitable to establish and maintain the fluid bed even in the periods when the current to be purified is not being fed.

The very low percentage of humidity of the particles present in the gaseous current, this percentage being caused by the cooling conditions established in the heat exchanger 13, and also the low temperature of input of the gaseous current causes a very high efficiency of adsorption within the reactor 16.

This very high efficiency of adsorption makes possible a reduced concentration of active substances, of about 0.1 to 0.5 kg/m$^3$, within the reactor 16.

Moreover, the condensation and elimination of the acid and aggressive substances possibly included in the gaseous current makes unnecessary the addition of additive substances such as lime or other substances into the reactor 16; all of this situation leads to a considerable reduction of the processing cost.

Furthermore, this makes the reactor 16 substantially independent of the type of plant upstream of itself and/or of the characteristics and type of the gaseous current to be purified.

According to the invention the speed of the ingoing gaseous current undergoes first a reduction in an expansion chamber 17 leading into the reactor 16 and then an increase due to an introduction and distribution plate 18 and then is decelerated thereafter within the reactor 16.

The increase of speed caused by the introduction and distribution plate 18 has the purpose of creating in the reactor 16 the conditions for formation of a fluid bed circulating at a high speed with a great degree of turbulence and agitation.

In this case the introduction and distribution plate 18 consists of a perforated plate located in the lower part of the reactor 16 and delimiting at least an upper processing zone of the reactor 16 which contains the solid adsorbent support in suspension.

According to a variant a plurality of introduction and distribution plates 18 are arranged at different levels of height in the reactor 16 and are suitable to obtain further increases and consecutive decelerations of the speed of the ascending gaseous current so as to increase the turbulence and enhance the re-distribution of the solid.

The reactor 16 is dimensioned in such a way that in cooperation with the reduction of speed of the gaseous current caused by the expansion chamber 17 and with the increase of speed caused by the introduction and distribution plate 18 the time for passing through the upper processing zone of the reactor 16 is at least greater than 3 seconds, and advantageously between 5 and 8 seconds.

At the outlet of the reactor 16 the gaseous current together with the particles of the solid support drawn with it and mixed with it is sent through a pipe 19 into a separator assembly 20.

The separator assembly 20, which is advantageously but not necessarily of a cyclone type, separates the biggest particles of the solid support from the flow of gaseous current and discharges those particles through a discharge nozzle 21 into a tank 22.

The tank 22 is associated with means 23 able to return those particles of the solid support into the reactor 16, advantageously to a position immediately above the introduction and distribution plate 18 so as to provide continuous replenishment of the solid support.

This recirculation of the solid support is assisted by the greatly reduced degree of humidity obtained by the particles during the passage of the gaseous current within the reactor 16.

These means 23 are, for instance, such as a worm conveyor or another suitable type of conveyor.

The tank 22 includes means 24 to discharge powders and means 25 to feed powders, these means 24, 25 having the respective tasks of discharging any solid support no longer efficient in terms of adsorption and of introducing new solid support.

The gaseous current leaving the separator 20 is sent through a discharge pipe 26 into a filter assembly 27, which has the task of eliminating any residues of solid support still mixed with the gaseous current.

The filter assembly 27 consists of a sleeve filter or another dry filtration system suitable for the purpose.

The filter assembly 27 is associated with a conveyor 28, which has the task of returning the solid filtered particles into the tank 22.

The filtered gaseous current is sent for discharge through the stack 15.

According to the invention an analyser unit 29 to analyse fumes is included upstream of the stack 15 and has the purpose of testing the efficacy and efficiency of the treatment before discharge of the fumes into the atmosphere.

This fumes analyser unit 29 is positioned upstream of a fourth pipeline 30 comprising at least one valve 31 and a fan 32, which has the task of withdrawing at least a part of the gaseous current before discharge thereof and of sending that part back into the reactor 16 either for a new adsorption cycle or to ensure the necessary kinetic and fluid-dynamic conditions required for fluidisation in the reactor 16 when so required in the event of fluctuation of the gaseous current.

We claim:

1. Method to remove organic halogenated molecules from gaseous currents, comprising the steps of:
   filtering the gaseous current which contains the organic halogenated molecules;
   cooling the gaseous current to a temperature lower than 80° C.;
   then delivering the cooled gaseous current into a reactor containing a fluid bed consisting at least partially of at least one solid adsorbent element in a particulate form; and
   contacting the gaseous current with the at least one solid adsorbent element with exchange by adsorption between the gaseous current and the at least one solid adsorption element, the reactor being dimensioned according to the speed of passage of the gaseous current so as to achieve a time of contact between the gaseous current and the at least one solid adsorbent element at least longer than 3 seconds.

2. Method as in claim 1, in which the concentration of the at least one solid adsorbent element within the reactor is between 0.1 and 0.5 kg. per each cubic meter of gaseous current treated.

3. Method as in claim 1, in which the step of cooling the gaseous current to a temperature lower than 80° C. is carried out in a gas/water or gas/air heat exchanger and wherein acid and/or aggressive substances included at a low dew point in the gaseous current to be purified condense in the heat exchanger and are eliminated through a third pipeline.

4. Method as in claim 1, in which the step of filtering precedes the step of cooling and is carried out by a high-efficiency filtration assembly selected from the group consisting of a fabric sleeve filter, and electrostatic precipitator, a cyclone separator, and a Venturi scrubber according to the type of plant which produces the gaseous current to be purified.

5. Method as in claim 1, in which the gaseous current immediately upstream of the fluid bed undergoes an acceleration by means of introduction and distribution means.

6. Method as in claim 1, in which the gaseous current undergoes, downstream of the reactor, a first step of separation of solid particles of the at least one solid adsorbent element from the gaseous current.

7. Method as in claim 6, in which the step of separation of solid particles from the gaseous current is associated with a process of accumulation and recirculating of solid particles in the reactor.

8. Method as in claim 7, in which the recirculating of the solid particles takes place at a position immediately downstream of introduction and distribution means.

9. Method as in claim 6, in which at least one step of filtration with an accumulation and recirculating of solid filtered particles is included downstream of the first separation step.

10. Method as in claim 9, in which the current, downstream of the step of filtration and upstream of a fumes discharge stack, undergoes a fumes analysis step governing recirculation means which recirculate at least a percentage of the current to the reactor.

11. Method as in claim 1, in which the at least one solid adsorbent element comprises activated carbon in particles of a small granule size or as a powder.

12. Method as in claim 1, in which the at least one solid adsorbent element comprises a mixture of activated carbon and powders of another kind.

13. Method as in claim 1, wherein the step of cooling is carried out in at least one indirect cooling heat exchanger.

14. Method as in claim 1, wherein the temperature to which the gaseous current is cooled is between 30° C. and 70° C.

15. Method as in claim 1, wherein the step of cooling is carried out in at least a gas/water or gas/air heat exchanger.

16. Method as in claim 15, wherein the temperature to which the gaseous current is cooled is between 30° C. and 70° C.

17. Plant for the removal of organic halogenated molecules from gaseous current, comprising at least one indirect cooling heat exchanger for cooling the gaseous current to a temperature at which the organic halogenated molecules are exchanged by adsorption and, operably connected downstream thereof, a reactor comprising at least one first input zone, at least one second zone of exchange by adsorption between the gaseous current and a desired solid support in the form of particles kept in suspension as a fluid bed, and means to introduce and distribute the gaseous current defining the second zone of the reactor where the solid support in suspension is contained, the reactor having dimensions functionally correlated with the speed of passage of the gaseous current such as to achieve a passage time at least longer than 3 seconds, the concentration of solid support within the reactor being between 0.1 and 0.5 kg. per each cubic meter of gaseous current to be purified.

18. Plant as in claim 17, in which at least one of the at least one indirect cooling heat exchanger is a gas/water or gas/air heat exchanger.

19. Plant as in claim 18, in which a high-efficiency filtration assembly is included upstream of the gas/water or gas/air heat exchanger.

20. Plant as in claim 19, in which the filtration assembly is a sleeve fabric filter or an electrostatic precipitator or a cyclone separator.

21. Plant as in claim 19, in which, in the filtration assembly is a Venturi scrubber.

22. Plant as in claim 11, in which a pre-cooling assembly of an indirect type suitable to lower the temperature of the ingoing gaseous current to a value between 120° C. and 200° C. is included upstream of the filtration assembly.

23. Plant as in claim 17, in which at least one assembly to separate the gaseous current from particles of the solid support in association with an assembly for accumulation and replenishing of particles of the solid support connected to the reactor is included downstream of the reactor.

24. Plant as in claim 23, in which the replenishing assembly cooperates with the reactor at a position immediately downstream of the introduction and distribution means.

25. Plant as in claim 23, in which a filtration assembly associated with the assembly performing accumulation and replenishing of particles of the solid support is included downstream of the separation assembly.

26. Plant as in claim 25, in which a unit to analyse fumes which governs means that return at least a percentage of the gaseous current to the reactor is included downstream of the filtration assembly and upstream of a fumes discharge stack.

* * * * *